United States Patent
Salter et al.

(10) Patent No.: US 10,106,075 B2
(45) Date of Patent: Oct. 23, 2018

(54) VEHICLE HAZARD NOTIFICATION SYSTEM

(71) Applicant: Ford Global Technologies, LLC, Dearborn, MI (US)

(72) Inventors: Stuart C. Salter, White Lake, MI (US); Aaron Bradley Johnson, Allen Park, MI (US); Paul Kenneth Dellock, Northville, MI (US); Stephen Kenneth Helwig, Farmington Hills, MI (US); Pietro Buttolo, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/432,155

(22) Filed: Feb. 14, 2017

(65) Prior Publication Data

US 2018/0229649 A1    Aug. 16, 2018

(51) Int. Cl.
| | |
|---|---|
| *B60Q 1/52* | (2006.01) |
| *B60Q 1/46* | (2006.01) |
| *B60Q 1/32* | (2006.01) |
| *B60Q 1/48* | (2006.01) |
| *G01S 19/42* | (2010.01) |

(52) U.S. Cl.
CPC ............... *B60Q 1/46* (2013.01); *B60Q 1/323* (2013.01); *B60Q 1/486* (2013.01); *G01S 19/42* (2013.01)

(58) Field of Classification Search
CPC ................................ G08G 1/20; G08G 1/205
See application file for complete search history.

(56) References Cited

U.S. PATENT DOCUMENTS

| | | |
|---|---|---|
| 4,807,101 A | 2/1989 | Milde, Jr. |
| 4,843,370 A | 6/1989 | Milde, Jr. |
| 6,963,275 B2 | 11/2005 | Smalls |
| 7,095,136 B2 | 8/2006 | Rowledge |
| 7,404,372 B2 | 7/2008 | Aasgaard |
| 2003/0016146 A1* | 1/2003 | Bates ................. G08G 1/20 340/988 |
| 2007/0152803 A1* | 7/2007 | Huang ............... B60Q 1/525 340/435 |
| 2015/0251598 A1 | 9/2015 | Andrews |

FOREIGN PATENT DOCUMENTS

WO    03102892 A1    12/2003

* cited by examiner

*Primary Examiner* — Omeed Alizada
(74) *Attorney, Agent, or Firm* — Jason Rogers; Price Heneveld LLP (57) ABSTRACT

A hazard notification system for a vehicle is disclosed. The system comprises a plurality of exterior lights and a positioning system configured to identify a location of the vehicle. The system further comprises a controller. The controller is configured to identify the vehicle in an unestablished parking region based on the location and receive an indication of a parked condition of the vehicle. In response to the parked condition and the vehicle located in the unestablished parking region, the controller is configured to activate the exterior lights.

10 Claims, 6 Drawing Sheets

VEHICLE HAZARD NOTIFICATION SYSTEM

FIELD OF THE DISCLOSURE

The present disclosure generally relates to a notification system for a vehicle and more particularly relates to a control system and method configured to activate a lighting system for a vehicle.

BACKGROUND OF THE DISCLOSURE

Vehicle indicator lights may be utilized in a variety of situations to notify approaching vehicles of a planned direction change, stoppage, and/or hazard indication. However, during some roadside situations vehicle operators may be distracted from activating hazard lighting or a hazard notification system. Accordingly, the disclosure provides for various embodiments of a hazard notification system to assist vehicle operators.

SUMMARY OF THE DISCLOSURE

According to one aspect of the present disclosure, a hazard notification system for a vehicle is disclosed. The system comprises a plurality of exterior lights and a positioning system configured to identify a location of the vehicle. The system further comprises a controller. The controller is configured to identify the vehicle in an unestablished parking region based on the location and receive an indication of a parked condition of the vehicle. In response to the parked condition and the vehicle located in the unestablished parking region, the controller is configured to activate the exterior lights.

According to another aspect of the present disclosure, a vehicle notification apparatus is disclosed. The apparatus comprises a plurality of indicator lights, at least one vehicle entry light, and a detection sensor. The detection sensor is configured to identify a location of an object proximate the vehicle. The apparatus further comprises a controller. The controller is configured to activate the indicator lights in response to an input identifying a warning condition and a location of the vehicle. The controller is further configured to activate the entry light to illuminate a region proximate the object during the warning condition.

According to yet another aspect of the present disclosure, a vehicle notification system is disclosed. The system comprises a plurality of indicator lights disposed on a vehicle and a positioning system configured to identify a location of the vehicle. The system further comprises a controller configured to activate the indicator lights in response to an input identifying a warning condition, an indication that the vehicle is idle, and the location indicating the vehicle located in an unestablished parking region.

These and other aspects, objects, and features of the present disclosure will be understood and appreciated by those skilled in the art upon studying the following specification, claims, and appended drawings.

DETAILED DESCRIPTION OF THE PREFERRED EMBODIMENTS

Figure 1:
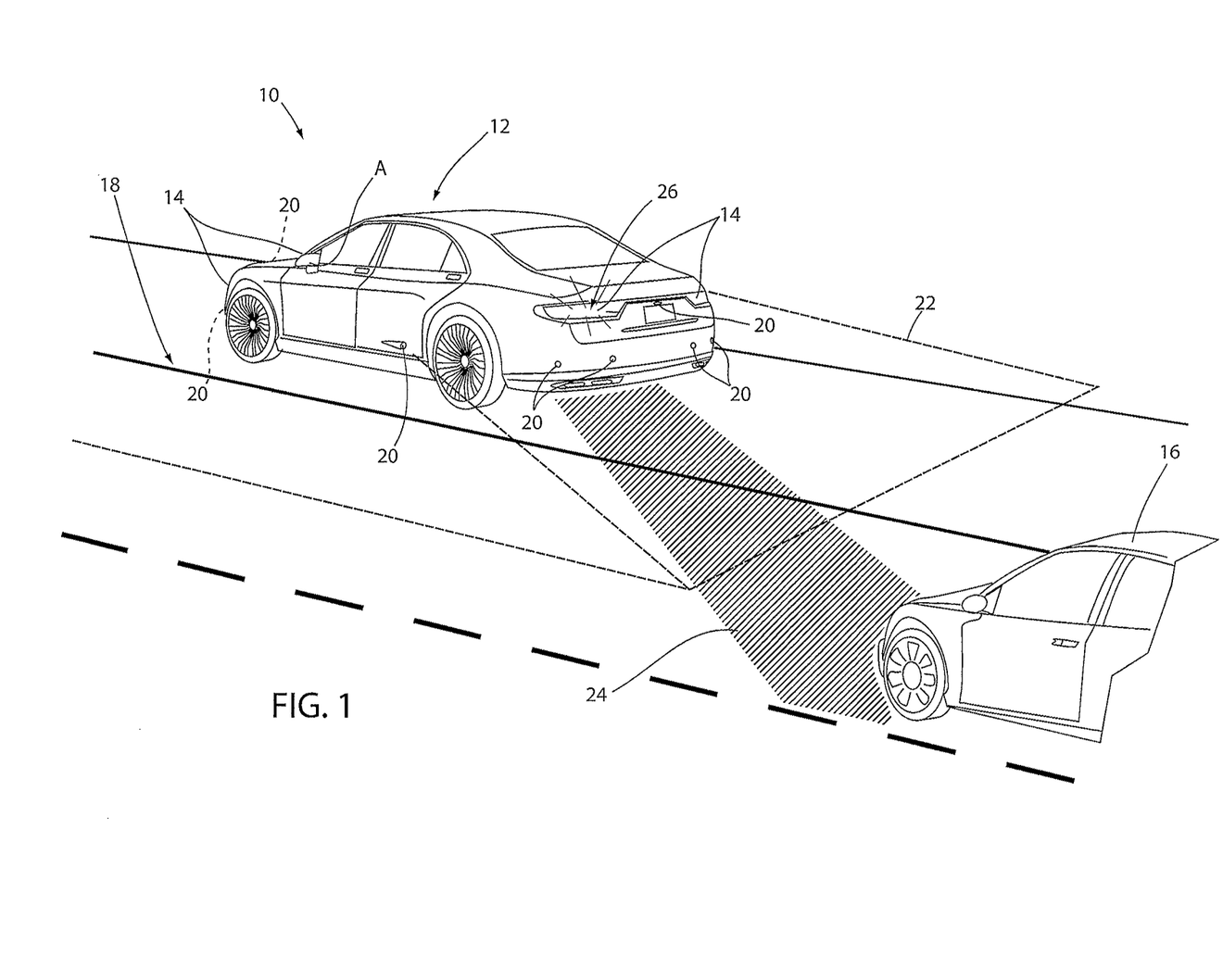
FIG. 1 is a projected view of a vehicle comprising a hazard notification system demonstrated in a roadside parking situation.

For purposes of description herein, the terms "upper," "lower," "right," "left," "rear," "front," "vertical," "horizontal," "interior," "exterior," and derivatives thereof shall relate to the equipped vehicle as oriented in FIG. 1. However, it is to be understood that the device may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIG. 1, an environmental view of a vehicle 10 in a roadside parking situation is shown. The vehicle 10 may be equipped with a hazard notification system 12. The hazard notification system 12 may comprise a plurality of exterior lights 14 configured to notify approaching vehicles 16 of a location of the vehicle 10. The hazard notification system 12 may be configured to automatically activate in response to one or more inputs and/or vehicle status conditions to automatically activate a hazard notification communicated by the exterior lights 14. In various embodiments, the hazard notification system 12 may be configured to initiate a road hazard indication routine in response to a variety of conditions that may correspond to a vehicle hazard condition.

For example, in some embodiments, the vehicle 10 may comprise a positioning system (e.g. a global positioning system [GPS]) in communication with the hazard notification system 12. In such embodiments, the hazard notification system 12 may identify the location of the vehicle 10 based on GPS or map data communicated from the positioning system. The map data may include relevant information related to a parking location 18 of the vehicle 10. For example, the map data may comprise an identification indicating whether the parking location 18 corresponds to an established parking region or an unestablished parking region. In this way, the hazard notification system 12 may activate the exterior lights 14 to provide a hazard indication in response to identifying that the vehicle 10 is parked in an unestablished parking region (e.g. parking location 18) identified from the map data. Further discussion in reference to exemplary map data, which may be provided to the hazard notification system 12 by a positioning system, is discussed in reference to FIG. 4.

In some embodiments, the hazard notification system 12 may further be in communication with one or more sensors 20 of the vehicle 10. Further discussion regarding particular types of sensory technologies that may be utilized for the sensors 20 is further discussed in reference to FIG. 3. In various embodiments, the sensors 20 may be configured to monitor a detection region 22 proximate the vehicle 10. The detection region 22 may comprise a perimeter substantially surrounding the vehicle 10. In this way, the hazard notification system 12 may receive the indication from one or more of the sensors 20 indicating the detection of the approaching vehicle 16. Based on the indication or signal from one or more of the sensors 20, the hazard notification system 12 may be configured to identify an approach direction or hazard region 24, which may correspond to an approach path of the approaching vehicle 16. In response to the identification of the approaching vehicle 16, the hazard notification system 12 may activate the exterior lights 14 to provide a hazard notification to the approaching vehicle 16. Additionally, in some embodiments, the hazard notification system 12 may activate one or more of the exterior lights located within or proximate to the hazard region 24 to emit a warning indication 26 to emphasize a portion of the vehicle 10 that may be particularly susceptible to collision.

The warning indication 26 may correspond to a lighting scheme that may differ from the hazard indication output from the exterior lights located outside that hazard region 24. For example, in response to the detection of the approaching vehicle 16, the hazard notification system 12 may activate the exterior lights 14 in a first lighting pattern or frequency configured to communicate a hazard notification. Additionally, as the approaching vehicle 16 approaches the vehicle 10, the hazard notification system may identify the hazard region 24 in response to one or more indications or signals communicated by the sensors 20. In response to identifying the hazard region 24, the hazard notification system 12 may activate the warning indication 26 to be emitted from the exterior lights 14 located proximate to or within the hazard region 24. The hazard notification system 12 may control the warning indication 26 which may control the exterior lights 14 in the hazard region 24 to illuminate in a second pattern which may have a frequency difference from the hazard notification emitted from the exterior lights 14 outside the hazard region 24. In this way, the hazard notification system 12 may communicate the warning indication 26 as visual alert indicating the hazard region 24 to the approaching vehicle 16.

Accordingly, in various embodiments, the notification system 12 may be configured to automatically activate a first set of the exterior lights 14 to output a hazard notification in the first pattern. Additionally, the hazard notification system 12 may be configured to activate one or more of the exterior lights 14, which may correspond to a second set of the exterior lights 14, to emit the warning indication 26 in the hazard region 24. In this way, the warning indication 26 may provide a visual indication to the approaching vehicle 16 of the hazard region 24 while the hazard notification may also provide a general indication of the location of the vehicle 10 by emitting the hazard notification from the exterior lights 14 outside the hazard region 24. Though discussed in reference to particular examples, the notification system 12 as discussed herein may embody any number of combinations of lights and incorporating various light technologies (e.g. light emitting diodes [LEDs], halogen, incandescent, xenon, etc.) and related operations as disclosed.

In some embodiments, the hazard notification system 12 may activate the hazard indication of the exterior lights 14 in response to a combination of inputs or vehicle conditions that may indicate the vehicle 10 in a hazardous situation. For example, as previously discussed, the hazard notification system 12 may identify that the vehicle 10 is in a parked condition based on a signal communicated from a vehicle controller and further identify that the vehicle 10 is located to an unestablished parking region as indicated by a positioning system. Additionally, the hazard notification system 12 may be in communication with one or more vehicle systems and operable to identify a variety of warning conditions or vehicle conditions that may be utilized to activate the hazard notification emitted from the exterior lights 14. For example, the hazard notification system 12 may be in communication with vehicle systems configured to communicate an engine notification, a low fuel notification, a suspension failure, a tire pressure indication, a break warning indication, a door or closure ajar status, and/or a variety of additional conditions. Accordingly, the hazard notification 12 system may be operable to identify one or more vehicle conditions or warning conditions communicated by various vehicle systems to activate the hazard notification. An exemplary block diagram of the hazard notification system 12 is discussed in further detail in communication with the one or more vehicle systems and/or sensors in reference to FIG. 6.

Figure 2:
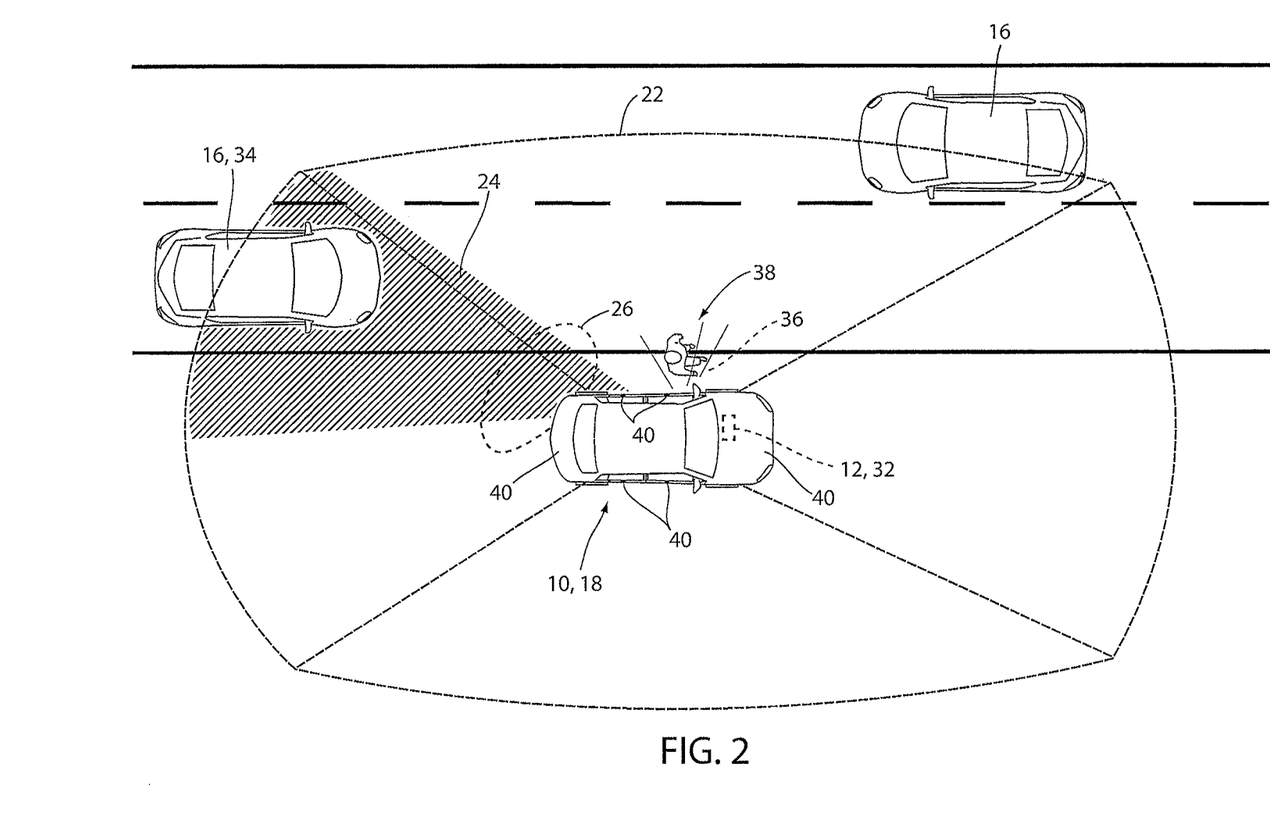
FIG. 2 is an elevational view of a vehicle comprising a hazard notification system in a roadside parking situation.

Referring now to FIG. 2, an elevational view of the vehicle 10 is shown in a roadside parking scenario. In such scenario, the hazard notification system 12 may identify that the vehicle 10 is in a parked condition or idle condition based on a gear selection, vehicle speed, GPS signal or location signal, and/or a variety of vehicle conditions communicated to the hazard notification system 12. Upon identifying the parked condition of the vehicle 10, the hazard notification system 12 may process map or location data from a positioning system 32. The location data may include an indication or information identifying whether the parking location 18 of the vehicle 10 corresponds to an established parking region or an unestablished parking region. In response to identifying the vehicle 10 in the parked condition and located in an unestablished parking region, the hazard notification system 12 may activate one or more of the exterior lights 14 to emit a hazard notification. In this way, the hazard notification system 12 may automatically activate the hazard notification to provide a visual notification to the approaching vehicles 16.

As previously discussed, the hazard notification system 12 may further be configured to emit a warning indication 26 from one or more of the exterior lights 14 located proximate the hazard region 24. As demonstrated in FIG. 2, the hazard region 24 may correspond to a portion of the detection region 22 identified by the hazard notification system 12 based on a detection of an approaching object (e.g. a nearside approaching vehicle 34). For example, the notification system 12 may identify the approaching vehicle 16 based on one or more detection signals from the sensors 20. In this way, the hazard notification system 12 may be operable to output the warning indication 26 from one or more of the exterior lights 14 proximate the hazard region 24 as indicated by the detection signals from the one or more sensors 20.

In an exemplary embodiment, the hazard notification system 12 may be operable to activate a vehicle passenger warning light 36 configured to identify a location of a vehicle passenger 38 or operator of the vehicle 10 who has exited the vehicle 10. For example, once the hazard notification system 12 has identified the hazard condition and activated the hazard notification from the exterior lights 14, the hazard notification system 12 may continue to monitor one or more of the sensors 20 and various vehicle conditions that may indicate the vehicle passenger 38 located outside the vehicle 10. For example, the hazard notification system 12 may be in communication with one or more door and/or closure sensors or a seat occupancy/weight sensor configured to indicate an ajar status of one or more doors or closures 40 or occupancy of the vehicle 10. In this way, in response to the ajar status or occupancy of the vehicle 10, the hazard notification system 12 may automatically activate the vehicle passenger warning light 36 to illuminate a region proximate the vehicle 10 indicating a likely location of the vehicle passenger 38.

The vehicle passenger warning light 36 may correspond to one or more of the exterior warning lights 14, which may include a plurality of access lights configured to illuminate access regions proximate one or more of the closures 40 of the vehicle 10. Specific examples of access lights that may be illuminated to function as the warning indication 26 and/or the passenger warning light 36 may include, but are not limited to vehicle entry lamps, puddle lamps, engine compartment lamps, trunk compartment lamps, headlamps, tail lights, indicator lights, and other related forms of illumination devices. As provided by the various embodiments described herein, the hazard notification system 12 may provide for a flexible system configured to provide a variety of solutions to communicate vehicle hazard lighting indications, warning indications, and/or passenger warning light 36 indications to improve operation of the vehicle 10.

In some embodiments, the hazard notification system 12 may be operable to identify a location or direction of a vehicle passenger 38 relative to the vehicle 10. For example, once the hazard notification system 12 has activated a hazard notification from the exterior lights 14, the hazard notification system 12 may continue to monitor the sensors 20 to identify a location, direction, or relative position of the vehicle passenger 38 proximate the vehicle 10. In response to identifying the location of the vehicle passenger 38, the hazard notification system 12 may activate the vehicle passenger warning light 36 to illuminate the vehicle passenger 38 and/or illuminate a region proximate the vehicle passenger 38. Accordingly, the hazard notification system 12 may monitor signals from the sensors 20 and a variety of vehicle conditions to activate one or more of the exterior lights 14 to output the vehicle passenger warning light 36 and/or the warning indication 26 identifying the hazard region 24. As discussed herein, the hazard notification system 12 may utilize a variety of sensory technologies to implement the various embodiments of the sensors 20 as discussed herein. Further discussion of the sensors 20 is provided in reference to FIG. 3.

Figure 3:
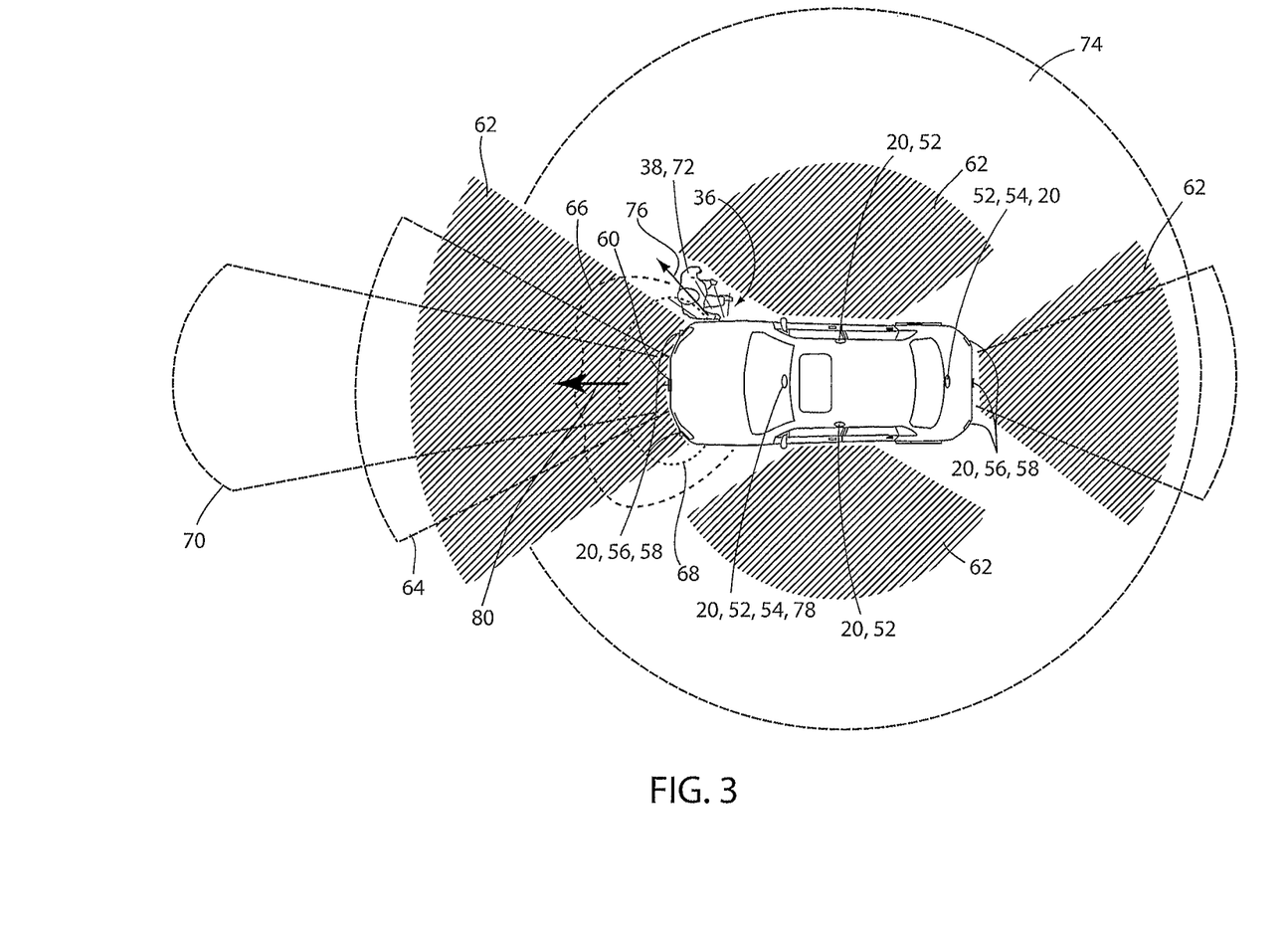
FIG. 3 is an elevational diagram of a vehicle comprising a hazard notification system demonstrating a plurality of sensors.

Referring now to FIG. 3 an elevational, schematic view of the vehicle 10 is shown demonstrating various implementations of the sensors 20. As an exemplary demonstration, a plurality of embodiments of sensors that may be utilized to implement the sensors 20 are disclosed to provide a comparison of nominal operating ranges of each of the sensory technologies. For example, the sensors 20 may correspond to one or more of a camera based image sensor 52, an infrared sensor 54, a short range radar sensor 56, an ultra-sonic sensor 58, and/or a long range radar sensor 60. Each of the corresponding sensory technologies may comprise an operating range or a detection range over which the sensor may be operable to detect the approaching vehicles 16, vehicle passenger 38, and/or various other objects that may be located proximate the vehicle 10.

For example, the image sensor 52 may be configured to capture image data in a plurality of imaging regions 62 may be configured to capture image data and detect corresponding objects substantially around an entire perimeter region surrounding the vehicle 10. In this embodiment, the hazard notification system 12 may be operable to detect an object and identify a location of the object (e.g. the vehicle passenger 38) about a perimeter of the vehicle 10 based on the image data. In this way, the hazard notification system 12 may be operable to activate one or more of the exterior lights 14 to illuminate a region proximate the vehicle 10 corresponding to the location of the object (e.g. the vehicle passenger 38) identified from the image data.

Each of the sensors 20 may have a corresponding detection range that may be related to a particular sensory technology utilized to implement each sensor. For example, the IR sensor 54 may comprise an IR detection region 64, the short range radar sensor 56 may comprise a short range radar detection region 66, the ultra-sonic sensor 58 may comprise an ultra-sonic detection region 68, and the long range radar sensor 60 may comprise a long rang radar detection region 70. Each of the detection regions 62, 64, 66, 68, and 70 may correspond to regions in which the sensors 20 may be operable to detect the approaching vehicle 16, the vehicle passenger 38 and/or various objects that may be located proximate the vehicle 10 based on the particular sensory technology implemented. Though specific ranges and/or relative detection regions of each of the sensors 20 are demonstrated in FIG. 3, it shall be understood that the particular performance and sensory regions of the sensors 20 may vary based on currently available technologies and technological improvements that may be developed in the future. Accordingly, the disclosure may provide for the hazard notification system 12 to utilize a wide variety of sensory and/or detection technology that may be utilized to detect objects proximate to and/or approaching the vehicle 10 without departing from the spirit of the disclosure.

In some embodiments, the hazard notification system 12 may further be operable to detect a location or direction of the vehicle passenger 38 relative to vehicle 10 based on a transmitter 72 carried by the vehicle passenger 38. The transmitter 72 may be incorporated into a mobile electronic device and may correspond to a radio transmitter (e.g. Bluetooth transmitter, Bluetooth low energy transmitter, etc.). The transmitter 72 may provide for the hazard notification system 12 to detect a direction of the vehicle passenger 38 about a perimeter of the vehicle 10 within a transmission range 74 of the transmitter 72. For example, the hazard notification system 12 may be operable to identify the vehicle passenger 38 location in the transmission range 74 based on a direction 76, which may be identified from signals communicated to and from a directional antenna 78 incorporated in the vehicle 10 in communication with hazard notification system 12. In this way, the hazard notification system 12 may be operable to identify the direction of the vehicle passenger 38 relative to the vehicle 10 based on a triangulation calculation derived from communications to and from the transmitter 72.

In operation as demonstrated in FIG. 3, the hazard notification system 12 may be operable to identify a location or direction (e.g. direction 76) of an object or the vehicle passenger 38 based on a detection communicated from the sensor(s) 20 and/or the transmitter 72. The direction of the vehicle passenger 38 or object may be identified by the notification system 12 relative to a location and orientation of the vehicle 10. For example, the hazard notification system 12 may be operable to identify that the vehicle passenger 38 or an object is located in a direction (e.g. 20 deg. clockwise) relative to a vehicle forward heading 80. In the exemplary embodiment of FIG. 3, the direction 76 is shown identified by the notification system 12 as being approximately 35 deg. clockwise from the forward heading 80. In response to identifying the direction 76, the hazard notification system 12 may activate the vehicle passenger warning light 36 to illuminate an area proximate the vehicle passenger 38 or object. In this way, the hazard notification system 12 may provide for a variety of practical embodiments to support the operations of the hazard notification system 12 discussed herein.

Figure 4:
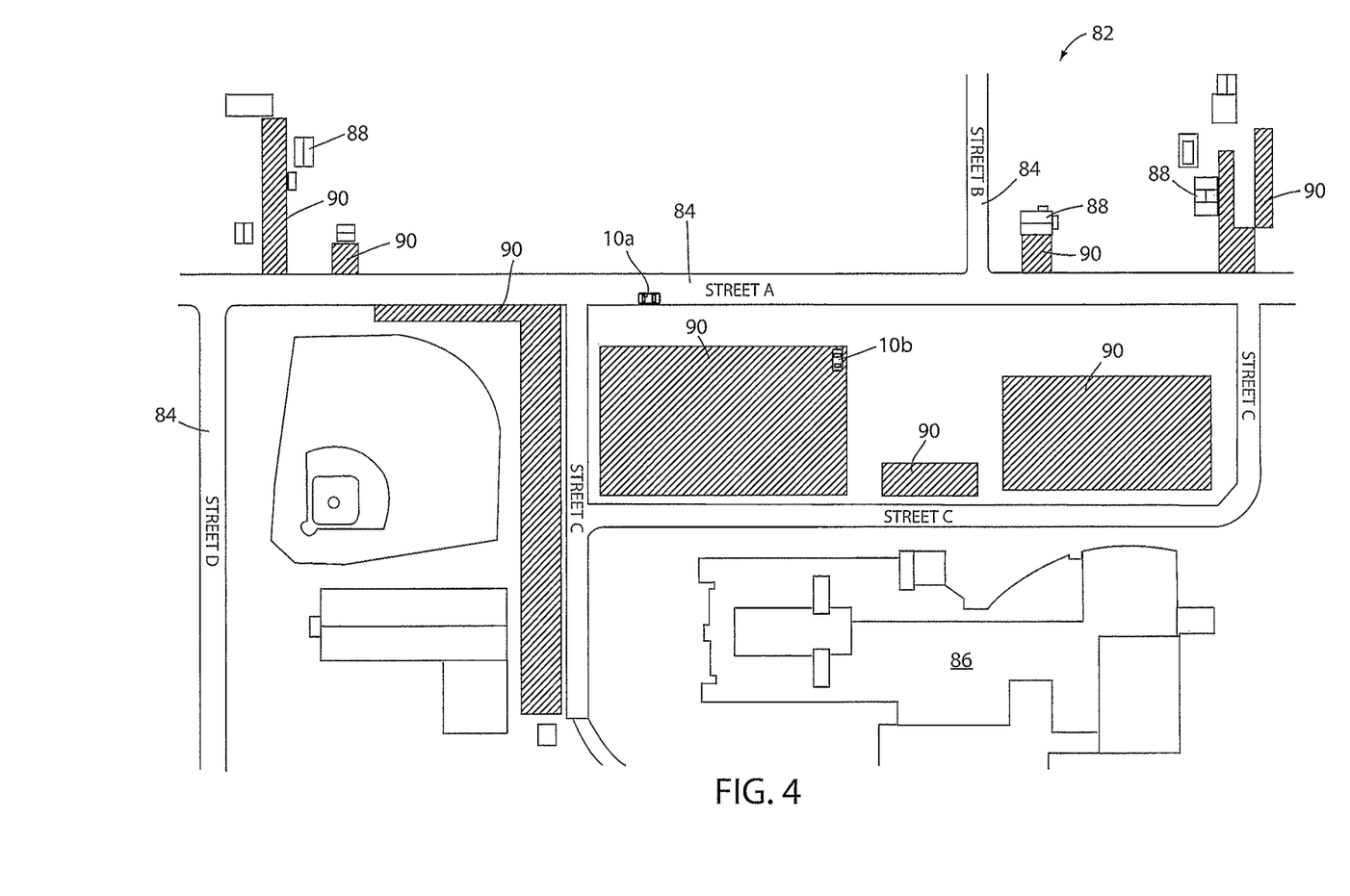
FIG. 4 is a diagram demonstrating exemplary map data utilized by a hazard notification system.

Referring now to FIG. 4, an exemplary embodiment of location data or map data 82 that may be utilized by the hazard notification system 12 and/or the positioning system 32 in communication therewith is shown. The map data 82 may comprise a variety of relevant information that may be utilized for navigation and/or operation of the vehicle 10. For example, the map data 82 may comprise various categories of map regions including but not limited to streets 84, buildings 86, residences 88, and established parking regions 90. Accordingly, the hazard notification system 12 may be operable to process the map data 82 to identify if the vehicle 10 is located in an established parking region 90.

For example, in response to receiving the map data 82 indicating that a vehicle 10a is located as demonstrated in FIG. 4, the hazard notification system 12 may process the map data 82 to identify that the vehicle 10a is located in an unestablished parking region. To be clear, the vehicle 10a is shown outside the established parking region identified by reference numeral 90. Additionally, in response to receiving the map data 82 identifying that the vehicle 10b is located as demonstrated in FIG. 4, the hazard notification system 12 may identify that the vehicle 10b is located within the established parking region 90. Accordingly, the hazard notification system 12 may utilize the map data 82 to identify if the vehicle 10 is located in an established parking region 90. Accordingly, the hazard notification system 12 may utilize the map data 82 alone or in combination with various conditions (e.g. parking gear activation) of the vehicle 10 located to control an activation of a hazard notification emitted from the exterior lights 14.

Figure 5:
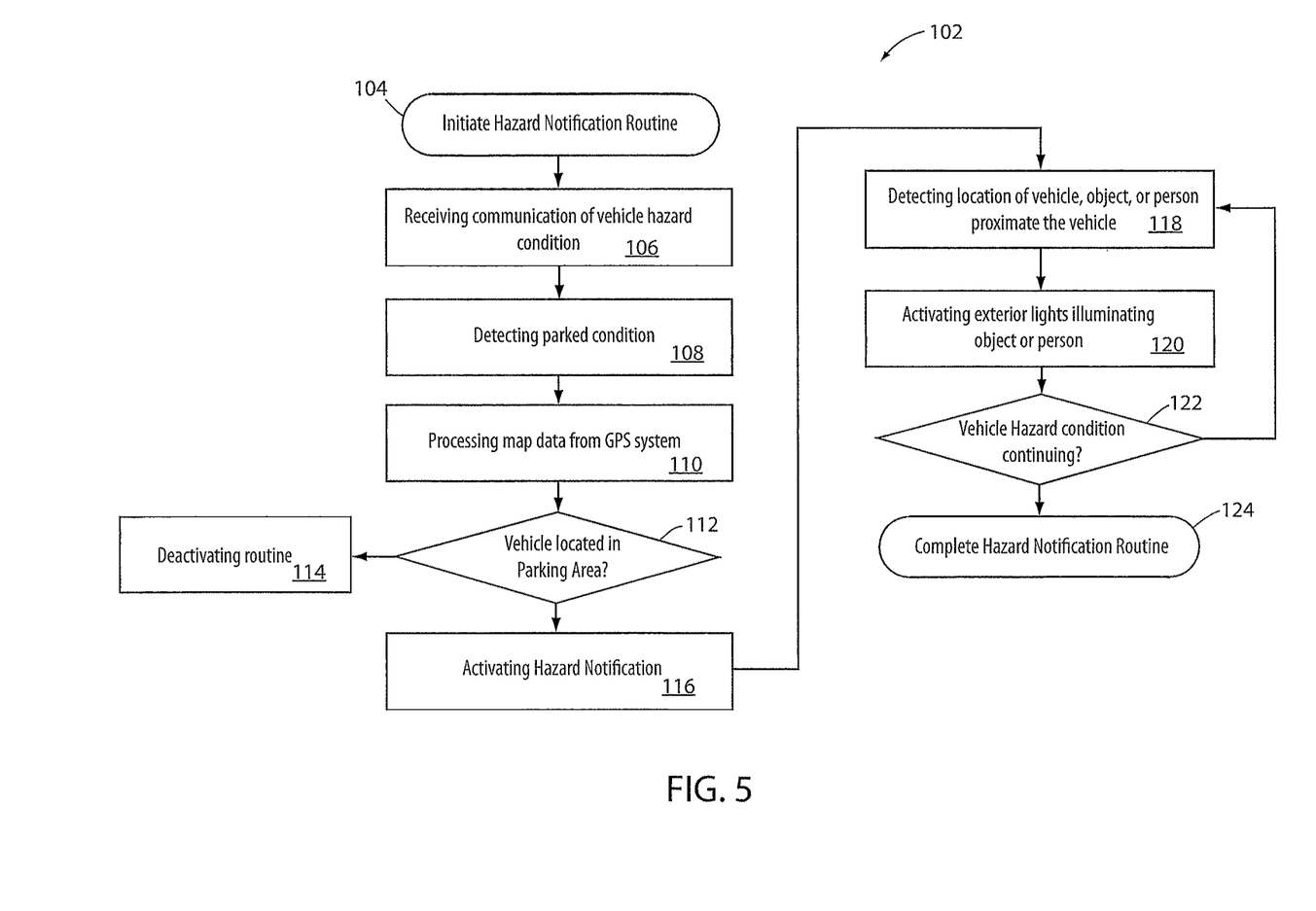
FIG. 5 is a flow chart demonstrating an activation routine of the hazard notification system.

Referring now to FIG. 5 a block diagram of a method 102 for controlling the hazard notification system 12 is shown. Method 102 may begin by initiating the hazard notification activation routine in step 104. Once initiated, the system 12 may receive a communication of a vehicle hazard condition (106). As discussed herein, a vehicle hazard condition may correspond to a variety of vehicle conditions. For example, vehicle conditions may include an engine notification, a low fuel notification, a suspension failure, a tire pressure indication, a brake warning indication, a closure or door ajar status, and various other conditions that may be identified relating a variety of systems of the vehicle 10.

The hazard notification system 12 may also be configured to detect a parked condition or idle condition of the vehicle 10 (108). The parked condition may be identified by the hazard notification system 12 in response to the vehicle 10 being configured in a parking gear. In some embodiments, the parked condition or idle condition may also be identified by the notification system based on a limited vehicle speed and/or a stationary or substantially stationary location indicated by the positioning system 32.

The system 12 may further be configured to process the map data 82 received from the position system (110). Based on the map data 82, the system 12 may identify if the vehicle 10 is located in the established parking region 90 (112). In step 112 if the vehicle 10 is identified as being located within the established parking region 90, the method 102 may continue to deactivate the hazard notification routine (114). If the system 12 identifies that the vehicle 10 is not located in the established parking region 90, the system 12 may continue the method 102 by activating the hazard notification from the exterior lights 14 (116). In response to the activation of the hazard notification, the notification system 12 may activate the exterior lights 14 to illuminate in a first lighting pattern or first intensity indicating a potential hazard.

Once the hazard notification is activated, the system 12 may continue to process information communicated by the sensors 20 to detect a location of the approaching vehicle 16, the vehicle passenger 38, or a variety of objects that may be located proximate the vehicle (118). In response to the detection in step 118, the system may activate the warning indication 26 and/or the vehicle passenger warning light 36 to illuminate the object, vehicle passenger 38 and/or hazard region 24 (120). The warning light activation may include the activation of one or more of the exterior lights 14 illuminated in a second lighting pattern and/or second intensity. In this way, the hazard notification 12 may not only automatically detect the vehicle hazard condition to activate the hazard notification, but may also activate a secondary warning light configured to illuminate the hazard region 24 and/or the vehicle passenger location. As previously discussed herein, the warning indication 26 identifying the location of the vehicle passenger 38 or the hazard region 24 may correspond to one or more of the exterior lights 14 of the vehicle 10, which may be illuminated in a different lighting pattern, frequency, color, or similarly differing configuration from the hazard notification. In this way, the notification system 12 may illuminate the vehicle passenger 38 and/or the hazard region 24 conspicuously with the warning indication 26 or warning light 36 about the perimeter of the vehicle 10.

Following step 120, the system 12 may continue to monitor the status of the vehicle 10 to identify if the hazard condition continues (122). The system 12 may identify a termination of the hazard condition in step 122 in response to detecting the vehicle 10 exiting or changing from the parked condition, and/or the vehicle hazard condition identified in step 106 being repaired or cleared. If the system 12 identifies that the vehicle hazard condition continues in step 122, the method 102 may return to step 118. If the system 12 identifies that the hazard condition does not persist in step 122, the method 102 may continue to step 124 to complete the hazard notification routine.

Figure 6:
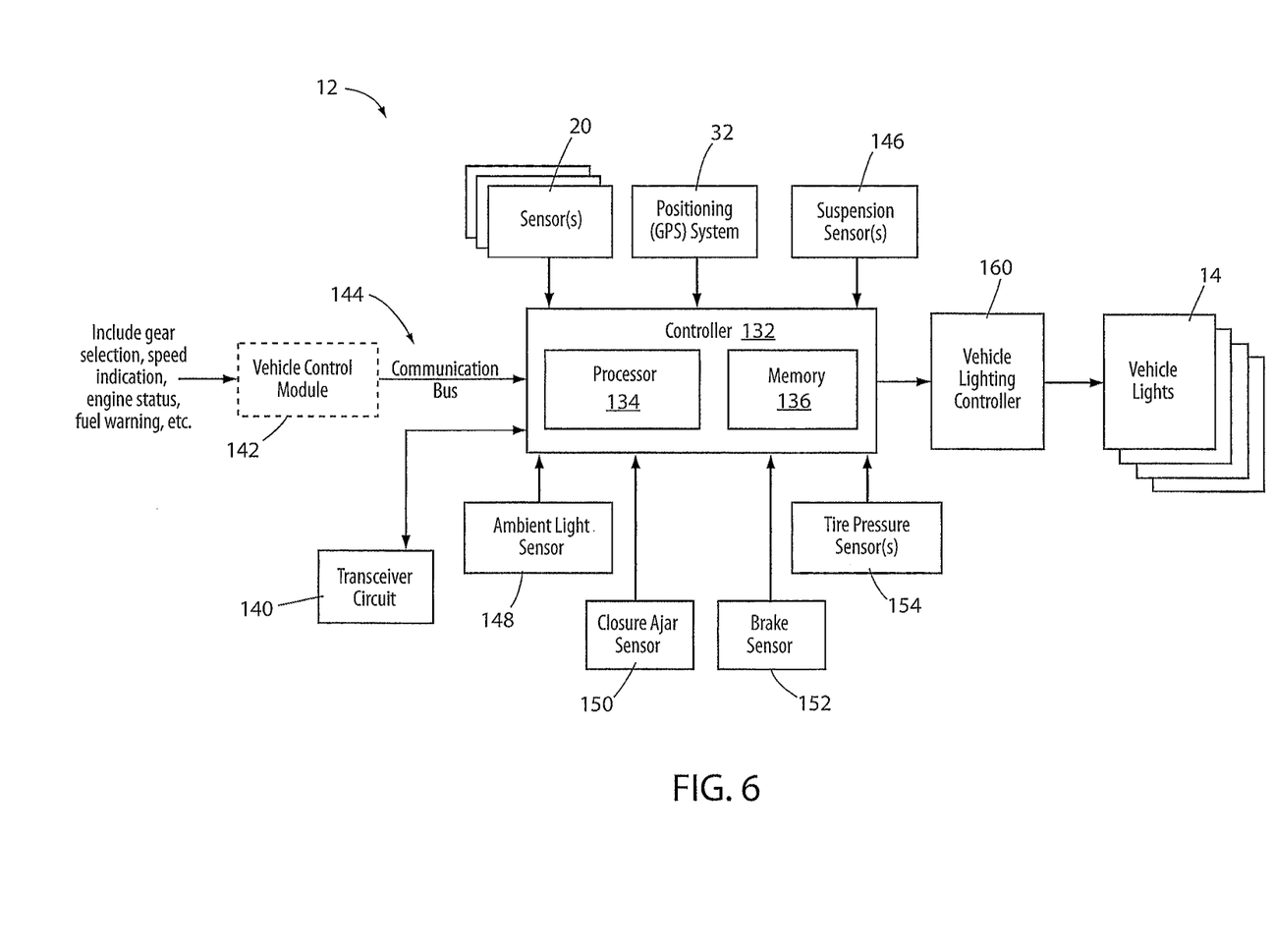
FIG. 6 is a block diagram of a hazard notification system in accordance with the disclosure.

Referring now to FIG. 6, a block diagram of the hazard notification system 12 is shown. The system 12 may comprise a controller 132, which may comprise a processor 134. The processor 134 may correspond to one or more circuits configured to receive signals and information from a variety of vehicle systems, peripherals, and systems discussed herein. The processor 134 may correspond to one or more microprocessors, circuits, application specific integrated circuits (ASIC), microprocessors, and/or related processing devices. The processor 134 may be in communication with a memory 136. The memory 136 may correspond to random access memory (RAM), read only memory (ROM), magnetic disc storage media, optical storage media, flash memory devices, etc. In various embodiments, the memory 136 may be configured to store machine readable information or routines to enable various processes and methods disclosed herein.

As discussed herein, the system may comprise one or more sensors 20 which may be in communication with a controller 132. The controller 132 may further be in communication with the positioning system 32 (e.g. global positioning system [GPS]). In an exemplary embodiment, the controller 132 may access the map data 82 via the memory 136, the positioning system 32, and/or via wireless communication through a transceiver circuit 140. The transceiver circuit 140 may further be in communication with the directional antenna 78 and configured to communicate with the transmitter 72 as discussed herein. The transceiver circuit 140 may correspond to a communication interface operating based on one or more known or future developed wireless communication technologies. For example, the transceiver circuit 140 may operate based on one or more protocols including but not limited to Zigbee, WiMAX, Wi-Fi, Bluetooth, and/or cellular protocols (e.g. GSM, CDMA, LTE, etc.).

The controller 132 may further be in communication with a vehicle control module 142 via a communication bus 144. In this way, the controller 132 may be configured to receive various signals or indications of vehicle status conditions including but not limited to a gear selection (e.g. park, drive, etc.), a vehicle speed, an engine status, a fuel warning, and various other vehicle conditions. The controller 132 may further be in communication with a variety of vehicle sensors configured to communicate various conditions of systems or devices related to the operation of the vehicle 10.

In some embodiments, the controller 132 may be in communication with one or more of a suspension sensor 146, an ambient light sensor 148, a closure or door ajar sensor 150, a brake sensor 152, and/or a tire pressure sensor 154. In such configurations, the controller 132 may be operable to monitor the status of various systems and devices related to the operation of the vehicle 10 based on signals or indications communicated from one or more of the vehicle monitoring systems 146-154. In response to a notification from the vehicle monitoring systems 146-154, the notification system 12 may be operable to identify a vehicle hazard condition as discussed in step 106 of the method 102.

In various embodiments, the controller 132 may further be in communication with a vehicle lighting controller 160. The vehicle lighting controller 160 may be configured to control one or more vehicle lights (e.g. the exterior vehicle lights 14). In some embodiments, the vehicle lighting controller 160 may be configured to control a first set or number of the vehicle lights to illuminate in a first pattern indicating a hazard condition of the vehicle 10. Additionally, the lighting controller 160 may be configured to selectively activate a second set or number of the vehicle lights 14 to illuminate a passenger 38 or an object proximate to or approaching the vehicle 10. The controller 132 may be in communication with the lighting controller 160 to communicate a location or region proximate the vehicle to illuminate the second set or number of the vehicle lights to illuminate the object proximate the vehicle. The illumination of the second set of vehicle lights 14 may correspond to the illumination of the vehicle passenger warning light 36 and/or the warning indication 26 as further discussed herein.

The disclosure provide for a variety of systems and configurations that may be utilized to activate a hazard or notification light configuration of the vehicle. Though a variety of specific exemplary systems are described, the beneficial systems provided herein may be combined in a variety of ways to suit a particular application for a vehicle or various other systems. Accordingly, it is to be understood that variations and modifications can be made on the aforementioned structure without departing from the concepts of the present disclosure, and further it is to be understood that such concepts are intended to be covered by the following claims unless these claims by their language expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A hazard notification system for a vehicle comprising:
   a plurality of exterior lights;
   an object detection sensor; and
   a controller configured to:
   receive an indication of a parked condition of the vehicle;
   detect an object proximate the vehicle;
   identify a hazard direction of the object from a plurality of directions distributed about a perimeter of the vehicle; and
   selectively activate a warning light of the plurality of exterior lights in response to the detection of the object, wherein the warning light is directed in the hazard direction to a proximate location of the object, and wherein the warning light illuminates a portion of the vehicle proximate to the hazard direction emphasizing a portion of the vehicle that is susceptible to collision based on the hazard direction.

2. The system according to claim 1, wherein the indication of the parked condition indicates at least one of a parked gear selection, and a combination of a limited vehicle speed occurring during an indication of a vehicle warning condition.

3. The system according to claim 2, wherein the limited vehicle speed is identified by the controller in response to a vehicle speed signal received from a speed sensor.

4. The system according to claim 2, wherein the limited vehicle speed is identified by the controller in response to a limited change in the location over a predetermined period of time.

5. A vehicle notification apparatus comprising:
a plurality of indicator lights;
a detection sensor configured to identify a direction of an object proximate the vehicle; and
a controller configured to:
detect an object proximate the vehicle;
identify a direction of the object from a plurality of directions distributed about a perimeter of the vehicle; and
selectively activate one of the indicator lights directed in the hazard direction illuminating a region proximate the object, wherein the indicator light illuminates the region in the direction of the object emphasizing a portion of the vehicle that is susceptible to collision.

6. The apparatus according to claim 5, wherein the indicator lights comprise a plurality of entry lights disposed proximate a plurality of entry doors of the vehicle.

7. The apparatus according to claim 5, wherein the indicator lights are configured to selectively illuminate a region proximate an entry door of the vehicle.

8. The apparatus according to claim 5, further comprising a positioning system configured to identify the location of the vehicle.

9. The apparatus according to claim 8, wherein the positioning system is further configured to identify the vehicle in an unestablished parking region based on the location.

10. The apparatus according to claim 8, wherein the controller is configured to activate the indicator lights in response to the input identifying the object proximate the vehicle and the location in the unestablished parking region.

* * * * *